United States Patent [19]

Nomura et al.

[11] Patent Number: 5,335,139
[45] Date of Patent: Aug. 2, 1994

[54] MULTILAYER CERAMIC CHIP CAPACITOR

[75] Inventors: Takeshi Nomura; Yukie Nakano, both of Chiba; Akira Satoh, Akita; Tomohiro Arashi, Chiba, all of Japan

[73] Assignee: TDK Corporation, Tokyo, Japan

[21] Appl. No.: 90,257

[22] Filed: Jul. 13, 1993

[30] Foreign Application Priority Data

| Jul. 13, 1992 | [JP] | Japan | 4-208483 |
| Mar. 19, 1993 | [JP] | Japan | 5-085705 |
| Jun. 1, 1993 | [JP] | Japan | 5-154355 |

[51] Int. Cl.$^5$ ............................. H01G 7/00
[52] U.S. Cl. ...................... 361/4; 29/25.42; 29/25.03; 252/520; 252/521; 501/137; 361/311; 361/321.2; 361/321.5
[58] Field of Search ............. 29/25.03, 25.42; 437/919; 148/DIG. 14; 501/137; 252/520, 521; 361/311, 321.1, 321.2, 321.3, 321.4, 321.5

[56] References Cited

U.S. PATENT DOCUMENTS 5,097,391  3/1992  Nomura et al. .............. 29/25.42

FOREIGN PATENT DOCUMENTS

| 0059888 | 5/1978 | Japan | 252/520 |
| 283256 | 3/1990 | Japan | |
| 3048414 | 3/1991 | Japan | 361/321.4 |

*Primary Examiner*—Olik Chaudhuri
*Assistant Examiner*—Ramamohan Rao Paladugu
*Attorney, Agent, or Firm*—Oblon, Spivak, McClelland, Maier & Neustadt

[57] ABSTRACT

A multilayer ceramic chip capacitor includes alternately stacked dielectric layers and internal electrode layers. The dielectric layers contain barium titanate as a major component and magnesium oxide, manganese oxide, barium oxide and/or calcium oxide, silicon oxide and optionally, yttrium oxide as minor components in such a proportion that there are present 0.1-3 mol of MgO, 0.05-1.0 mol of MnO, 2-12 mol of BaO+CaO, 2-12 mol of $SiO_2$ and up to 1 mol of $Y_2O_3$ per 100 mol of $BaTiO_3$. The capacitor satisfies the standard temperature dependence of capacitance and shows a minimized change of capacitance with time under an applied DC electric field and a long insulation resistance life. Where the dielectric layers contain 0.1-3 mol of MgO, 1-5 mol of $Y_2O_3$, 2-12 mol of BaO+CaO, and 2-12 mol of $SiO_2$ per 100 mol of $BaTiO_3$, the capacitor shows improved DC bias performance.

16 Claims, 3 Drawing Sheets

MULTILAYER CERAMIC CHIP CAPACITOR

BACKGROUND OF THE INVENTION

1. Field of the Invention

This invention relates to a multilayer ceramic chip capacitor.

2. Prior Art

Multilayer ceramic chip capacitors have been widely utilized as miniature size, high capacitance, high reliability electronic parts, a number of such capacitors being contained in a single electronic equipment. In accordance with a recently increasing demand for smaller size, higher performance electronic equipment, multilayer ceramic chip capacitors also encounter a more rigorous demand toward smaller size, higher capacitance, lower cost, and higher reliability.

The multilayer ceramic chip capacitors are generally fabricated by layering an internal electrode-forming paste and a dielectric layer-forming paste by sheeting, printing and similar techniques followed by concurrent firing for integration.

Generally the internal electrodes are of conductors such as Pd and Pd alloys although expensive palladium is partially replaced by the use of relatively inexpensive base metals such as Ni and Ni alloys. Since internal electrodes of base metals are oxidized if fired in ambient air, the dielectric layers and internal electrode layers must be co-fired in a reducing atmosphere. Firing in a reducing atmosphere, however, causes the dielectric layers to be reduced, resulting in a lowering of resistivity. Non-reducible dielectric materials are thus proposed. Multilayer ceramic chip capacitors using non-reducible dielectric materials, however, have problems including a short life of insulation resistance (IR) and low reliability.

When the dielectric material is subject to a DC electric field, there arises another problem that its relative dielectric constant $\epsilon_s$ lowers with time. If thinner dielectric layers are used in order to provide chip capacitors of a smaller size and greater capacitance, application of DC voltage across the capacitor causes the dielectric layers to receive a more intense electric field, resulting in a more remarkable change of dielectric constant $\epsilon_s$ with time, that is, a more remarkable change of capacitance with time.

Capacitors are also required to have good DC bias performance. The term DC bias performance used herein is a rate of change of the capacitance of a chip capacitor from the capacitance with an AC electric field applied thereto to the capacitance with an overlapping DC electric field applied thereto. The capacitance generally decreases as the applied DC electric field is increased. Capacitors with poor DC bias performance have the problem that when a DC electric field is applied across the capacitors during normal operation, the capacitors lower their capacitance significantly to below the required capacitance.

The EIA standards prescribe the standard known as X7R characteristic that a rate of change of capacitance should be within ±15% (reference temperature 25° C.) over the temperature range between −55° C. and 125° C.

One dielectric material known to meet the X7R characteristic is a composition of the $BaTiO_3+SrTiO_3+MnO$ system disclosed in Japanese Patent Application Kokai (JP-A) No. 36170/1986. This material, however, experiences a great change of capacitance with time under a DC electric field, for example, a capacitance change of −10% to −30% when a DC electric field of 50 volts is applied at 40° C. for 1,000 hours, failing to meet the X7R characteristic.

Other non-reducible dielectric porcelain compositions include the $BaTiO_3+MnO+MgO$ system disclosed in JP-A 71866/1982, the $(Ba_{1-x}Sr_xO)_aTi_{1-y}Zr_yO_2+\alpha((1-x)MnO+zCoO)+\beta((1-t)A_2O_5+tL_2O_3)+wSiO_2$ system disclosed in JP-A 250905/1986 wherein A is Nb, Ta or V and L is Y or a rare earth element, and barium titanate having added thereto $Ba_{\alpha}Ca_{1-\alpha}SiO_3$ in vitreous state disclosed in JP-A 83256/1990. These dielectric porcelain compositions could not meet all the requirements including good temperature dependence of capacitance, a minimized change of capacitance with time under a DC electric field, good DC bias performance, and a long accelerated life of insulation resistance. For example, the compositions of JP-A 250905/1986 and 83256/1990 have a short accelerated life of insulation resistance.

SUMMARY OF THE INVENTION

Therefore, an object of the present invention is to provide a multilayer ceramic chip capacitor which satisfies both the temperature dependence of capacitance, X7R characteristic according to the EIA Standards and B characteristic according to the EIAJ Standards, and shows a minimized change of capacitance with time under a DC electric field, and a long accelerated life of insulation resistance. Another object of the invention is to provide such a multilayer ceramic chip capacitor which further exhibits good DC bias performance.

The present invention provides a multilayer ceramic chip capacitor comprising alternately stacked dielectric layers and internal electrode layers.

According to a first aspect of the invention, the dielectric layers contain barium titanate as a major component and magnesium oxide, manganese oxide, at least one of barium oxide and calcium oxide, and silicon oxide as minor components in such a proportion that there are present MgO: 0.1–3 mol
MnO: 0.05–1.0 mol
BaO+CaO: 2–12 mol
SiO$_2$: 2–12 mol per 100 mol of BaTiO$_3$. If desired, the dielectric layers further contain yttrium oxide in an amount of up to 1 mol of Y$_2$O$_3$ on the same basis. It is noted that barium titanate, magnesium oxide, manganese oxide, barium oxide, calcium oxide, silicon oxide, and yttrium oxide are calculated as BaTiO$_3$, MgO, MnO, BaO, CaO, SiO$_2$, and Y$_2$O$_3$, respectively.

According to a second aspect of the invention, the dielectric layers contain barium titanate as a major component and magnesium oxide, yttrium oxide, at least one of barium oxide and calcium oxide, and silicon oxide as minor components in such a proportion that there are present MgO: 0.1–3 mol
Y$_2$O$_3$: more than 1 mol–5 mol
BaO+CaO: 2–12 mol
SiO$_2$: 2–12 mol per 100 mol of BaTiO$_3$. Preferably the dielectric layers further contain aluminum oxide in an amount of up to 1% by weight calculated as Al$_2$O$_3$. The dielectric layers further contain manganese oxide as a minor component in such a proportion that there is present up to 0.5 mol of MnO per 100 mol of BaTiO$_3$.

In either form, the internal electrode layers are preferably formed of nickel or a nickel alloy.

Often the multilayer ceramic chip capacitor is fabricated by alternately stacking dielectric layers and internal electrode layers to form a green chip, firing the green chip in an atmosphere having an oxygen partial pressure of $10^{-8}$ to $10^{-12}$ atm. at a temperature of 1,200° C. to 1,400° C., optionally annealing in an atmosphere having an oxygen partial pressure of at least $10^{-6}$ atm. at a temperature of up to 1,100° C., and attaching external electrodes.

DETAILED DESCRIPTION OF THE PREFERRED EMBODIMENTS

Capacitor configuration

Figure 1:
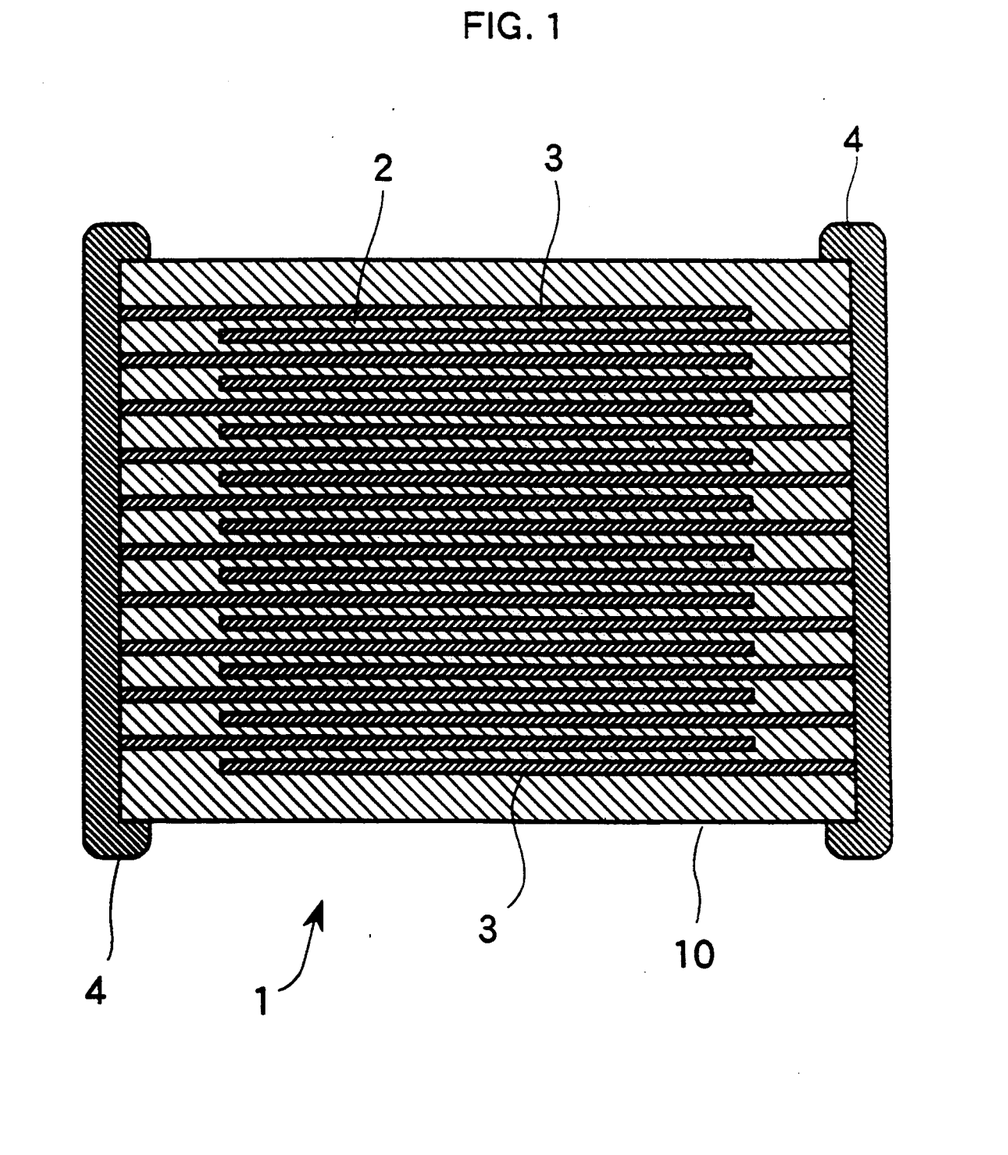
FIG. 1 is an elevational cross-sectional view of a multilayer ceramic chip capacitor according to one preferred embodiment of the invention.

Referring to FIG. 1, there is illustrated one exemplary structure of the multilayer ceramic chip capacitor according to the invention. The inventive capacitor generally designated at 1 includes a capacitor chip 10 having a plurality of alternately stacked dielectric layers 2 and internal electrode layers 3. The capacitor 1 further includes external electrodes 4 disposed on the side surfaces of the capacitor chip 10 and in electrical connection to the internal electrode layers 3. The shape of capacitor chip 10 is not critical although it is often rectangular shaped. Also the size is not critical and the chip may have appropriate dimensions in accordance with a particular application, typically in the range of 1.0-5.6 mm×0.5-5.0 mm×0.5-1.9 mm. The internal electrode layers 3 are stacked such that they at opposite ends are alternately exposed at the opposite side surfaces of the chip 10. That is, the internal electrode layers 3 of one group are exposed at one side surface of chip 10 and the internal electrode layers 3 of another group are exposed at the opposite side surface of chip 10. One external electrode 4 is applied to one side chip of the capacitor chip 10 in electrical contact with the internal electrode layers 3 of the one group, and the other external electrode 4 is applied to the opposite side surface of the chip 10 in electrical contact with the internal electrode layers 3 of the other group. A desired capacitor circuit is completed in this way.

Dielectric layer

Embodiment I

The dielectric layers in a first embodiment are formed of a dielectric material containing barium titanate as a major component and magnesium oxide, manganese oxide, at least one of barium oxide and calcium oxide, and silicon oxide as minor components. These components are contained in such a proportion that there are present MgO: 0.1–3 mol, preferably 0.5–1.5 mol
MnO: 0.05–1.0 mol, preferably 0.2–0.4 mol
BaO+CaO: 2–12 mol
SiO$_2$: 2–12 mol per 100 mol of BaTiO$_3$. The barium titanate, magnesium oxide, manganese oxide, barium oxide, calcium oxide, and silicon oxide are calculated as BaTiO$_3$, MgO, MnO, BaO, CaO, and SiO$_2$, respectively.

The molar ratio of (BaO+CaO)/SiO$_2$ is not critical, but generally ranges from 0.9 to 1.1. BaO, CaO and SiO$_2$ may be contained in the composite oxide form of $(Ba_xCa_{1-x}O)_y \cdot SiO_2$ wherein letters x and y are $0.3 \leq x \leq 0.7$ and $0.95 \leq y \leq 1.05$ in order for a sintered body to be dense. Preferably $(Ba_xCa_{1-x}O)_y \cdot SiO_2$ is contained in an amount of 1 to 10%, especially 4 to 6% by weight based on the total weight of BaTiO$_3$, MgO and MnO. The oxidation state of each oxide is not critical insofar as the contents of metal elements constituting the respective oxides are within the above-defined ranges.

Another minor component which can be contained in the material of which the dielectric layers are formed is yttrium oxide. Preferably yttrium oxide is contained in an amount of up to 1 mol calculated as Y$_2$O$_3$ per 100 mol calculated as BaTiO$_3$ of barium titanate. The lower limit of the Y$_2$O$_3$ content need not be determined, but is preferably 0.1 mol for yttrium oxide to exert its effect. Where yttrium oxide is contained, the content of $(Ba_xCa_{1-x}O)_y \cdot SiO_2$ is preferably 1 to 10%, especially 4 to 6% by weight based on the total weight of BaTiO$_3$, MgO, MnO and Y$_2$O$_3$.

Any desired compound may be contained in the dielectric material although it is preferred that the material is substantially free of cobalt oxide because its presence leads to an increased change of capacitance.

Described below are the reason for the limitation of the contents of the respective minor components.

Described below are the reasons for the limitation of the contents of the respective minor components.

With magnesium oxide contents below the above-defined range, it is difficult to provide desired temperature dependence of capacitance. Magnesium oxide contents above the above-defined range drastically detract from sinterability and thus lead to less densification, resulting in a shorter accelerated life of IR and a lower dielectric constant.

Manganese oxide contents below the above-defined range fail to provide desired anti-reducing property, resulting in a shorter accelerated life of IR and difficulty to reduce a dielectric loss tan δ. With manganese oxide contents above the above-defined range, it is difficult to reduce a change of capacitance with time upon application of a DC electric field.

Less contents of BaO+CaO, SiO$_2$, and $(Ba_xCa_{1-x}O)_y \cdot SiO_2$ result in a greater change of capacitance with time upon application of a DC electric field and a shorter accelerated life of IR. Larger contents of these components result in a drastic lowering of dielectric constant.

Yttrium oxide is effective for improving the accelerated life of IR. Yttrium oxide contents above the above-defined range result in a reduced capacitance and can detract from sinterability, leading to less densification.

Embodiment II

The dielectric layers in a second embodiment are formed of a dielectric material containing barium titanate as a major component and magnesium oxide, yttrium oxide, at least one of barium oxide and calcium oxide, and silicon oxide as minor components. These components are contained in such a proportion that there are present MgO: 0.1–3 mol, preferably 0.5–2.0 mol
$Y_2O_3$: from more than 1 mol to 5 mol, preferably 1.1–3.5 mol
BaO+CaO: 2–12 mol, preferably 2–6 mol
$SiO_2$: 2–12 mol, preferably 2–6 mol per 100 mol of $BaTiO_3$. Also, herein, the barium titanate, magnesium oxide, yttrium oxide, barium oxide, calcium oxide, and silicon oxide are calculated as $BaTiO_3$, MgO, $Y_2O_3$, BaO, CaO, and $SiO_2$, respectively.

The oxidation state of each oxide is not critical insofar as the contents of metal elements constituting the respective oxides are within the above-defined ranges.

Any desired compound may be contained in the dielectric material although it is preferred that the material is substantially free of cobalt oxide because its presence leads to an increased change of capacitance.

Described below are the reasons for the limitation of the contents of the respective minor components.

With magnesium oxide contents below the above-defined range, it is difficult to provide desired temperature dependence of capacitance. Magnesium oxide contents above the above-defined range drastically detract from sinterability and thus lead to less densification, resulting in a shorter accelerated life of IR and a lower dielectric constant.

Yttrium oxide is effective for improving the accelerated Life of IR and DC bias performance. The DC bias performance becomes poor with yttrium oxide contents of 1 mol or less on the above-defined basis. Yttrium oxide contents above the above-defined range result in a reduced dielectric constant and can detract from sinterability, leading to less densification.

Contents of BaO+CaO below the above-defined range result in a greater change of capacitance with time upon application of a DC electric field, a shorter accelerated life of IR, and undesirable temperature dependence of capacitance. Larger contents of these components result in a shorter accelerated life of IR and a drastic lowering of dielectric constant. Contents of $SiO_2$ below the above-defined range drastically detract from sinterability and thus lead to less densification, whereas larger contents beyond the range lead to a lowering of the initial insulation resistance.

The dielectric material may further contain manganese oxide as an additional minor component. Manganese oxide is effective for densification of dielectric layers and improving an accelerated Life of IR. With too larger contents of manganese oxide, it is difficult to reduce a change of capacitance with time upon application of a DC electric field. Preferably manganese oxide is contained in an amount of up to 0.5 mol, more preferably up to 0.3 mol calculated as MnO per 100 mol calculated as $BaTiO_3$ of barium titanate. To be fully effective, manganese oxide should preferably be contained in an amount of at least 0.01 mol on the same basis.

In the second embodiment, the dielectric material may further contain aluminum oxide which enables sintering at relatively low temperatures. It is preferably contained in an amount of up to 1% by weight calculated as $Al_2O_3$ of the entire dielectric material. Larger amounts of aluminum oxide would result in a noticeable lowering of dielectric constant and a short accelerated life of IR.

In either of the first and second embodiments, the dielectric layers have a structure in which each crystal grain of a high dielectric constant phase having a perovskite structure is surrounded by a grain boundary of a low dielectric constant phase, that is, a so-called core-shell structure. Typically, the crystal grain or core contains BaO, $TiO_2$, MnO, CaO, etc. and the grain boundary or shell contains CaO, $TiO_2$, BaO, $SiO_2$, MnO, MgO, $Y_2O_3$, etc.

The dielectric layers may have any desired means grain size. By limiting the dielectric material to the above-defined composition, there are obtained fine crystal grains which typically have a means grain size of about 0.2 to 0.7 μm. The shell typically has a mean width or thickness of about 0.02 to 0.2 μm.

The dielectric layers have an appropriate Curie temperature which is determined in accordance with the applicable standards by suitably selecting a particular composition of dielectric material. Typically the Curie temperature is higher than 85° C., especially about 120° to 135° C.

Each dielectric layer preferably has a thickness of up to about 50 μm, especially up to about 20 μm. The lower limit of thickness is about 0.5 μm, preferably about 2 μm. The present invention is effectively applicable to multilayer ceramic chip capacitors having such thin dielectric layers for minimizing a change of their capacitance with time. The number of dielectric layers stacked is generally from 2 to about 300, preferably from 2 to about 200.

Internal electrode layer

The conductor of which the internal electrode layer 3 are formed is not critical although a base metal is generally used since the dielectric material of the dielectric layers 2 has anti-reducing properties. Typical base metals are nickel and nickel alloys. Preferred nickel alloys are alloys of nickel with at least one member selected from Mn, Cr, Co and Al, with such nickel alloys containing at least 95% by weight of nickel being more preferred. It is to be noted that nickel and nickel alloys may contain up to about 0.1% by weight of phosphorus and other trace components.

The thickness of the internal electrode layers may be suitably determined in accordance with a particular purpose and application although its upper limit is typically about 5 μm, especially about 2.5 μm and its lower limit is typically about 0.5 μm, especially about 1 μm.

External electrode

The conductor of which the external electrodes 4 are formed is not critical although inexpensive metals such as nickel, copper and alloys thereof are generally used. The thickness of the external electrodes may be suitably determined in accordance with a particular purpose and application although it generally ranges from about 10 μm to about 50 μm.

Preparation

The multilayer ceramic chip capacitor of the present invention is generally fabricated by forming a green chip by conventional printing and sheeting methods using pastes, firing the chip, and printing or transferring external electrodes thereto followed by baking.

Paste for forming dielectric layers is obtained by mixing a raw dielectric material with an organic vehicle. The raw dielectric material may be a mixture of oxides and composite oxides as previously mentioned. Also useful are various compounds which convert to such oxides and composite oxides upon firing, for example, carbonates, oxalates, nitrates, hydroxides, and organometallic compounds. The dielectric material is obtained by selecting appropriate ones from these oxides and compounds and mixing them. The proportion of such compounds in the raw dielectric material is determined such that after firing, the specific dielectric layer composition may be met. The raw dielectric material is generally used in powder form having a mean particle size of about 0.1 to about 3 μm, especially about 0.1 to about 1 μm.

The organic vehicle is a binder in an organic solvent. The binder used herein is not critical and may be suitably selected from conventional binders such as ethyl cellulose. Also the organic solvent used herein is not critical and may be suitably selected from conventional organic solvents such as terpineol, butylcarbinol, acetone and toluene is accordance with a particular application method such as a printing or sheeting method.

Paste for forming internal electrode layers is obtained by mixing an electro-conductive material with an organic vehicle. The conductive material used herein includes conductors such as conductive metals and alloys as mentioned above and various compounds which convert into such conductors upon firing, for example, oxides, organometallic compounds and resinates. The organic vehicle is as mentioned above.

Paste for forming external electrodes is prepared by the same method as the internal electrodes layer-forming paste.

No particular limit is imposed on the organic vehicle content of the respective pastes mentioned above. Often the paste contains about 1 to 5% by weight of the binder and about 10 to 50% by weight of the organic solvent. If desired, the respective pastes may contain any other additives such as dispersants, plasticizers, dielectric compounds and insulating compounds. The total content of these additives is preferably up to 10% by weight.

A green chip is then prepared from the dielectric layer-forming paste and the internal electrode layer-forming paste. In the case of printing method, a green chip is prepared by alternately printing the pastes onto a substrate of polyethylene terephthalate (PET), for example, in laminar form, cutting the laminar stack to a predetermined shape and separating it from the substrate.

Also useful is a sheeting method wherein a green chip is prepared by forming green sheets from the dielectric layer-forming paste, printing the internal electrode layer-forming paste on the respective green sheets, and stacking the printed green sheets.

Then the green chip is removed of the binder and fired.

Binder removal may be carried out under conventional conditions, preferably under the following conditions where the internal electrode layers are formed of a base metal conductor such as nickel and nickel alloys.

Heating rate: 5°–300°0 C./hour, especially 10°–100° C./hour

Holding temperature: 200°–400° C., especially 250°–300° C.

Holding time: ½–24 hours, especially 5–20 hours

Atmosphere: air

The green chip is then fired in an atmosphere which may be properly determined in accordance with the type of conductor in the internal electrode layer-forming paste. Where the internal electrode layers are formed of a base metal conductor such as nickel and nickel alloys, the firing atmosphere may have an oxygen partial pressure of $10^{-8}$ to $10^{-12}$ atm. At an extremely low oxygen partial pressure below the range, the conductor can be abnormally sintered and disconnected. Above the range, the internal electrode layers are likely to be oxidized.

For firing, the chip is preferably held at a temperature of 1,100° to 1,400° C., more preferably 1,200° to 1,400° C., most preferably 1,200° to 1,300° C. Lower holding temperatures below the range would provide insufficient densification whereas higher holding temperatures beyond the range can lead to a greater change of capacitance with time upon application of a DC electric field.

Remaining conditions for sintering are preferably as follows.

Heating rate: 50°–500° C./hour, especially 200°–300° C./hour

Holding time: ½–8 hours, especially 1–3 hours

Cooling rate: 50°–500° C./hour, especially 200°–300° C./hour

The firing atmosphere is preferably a reducing atmosphere and an exemplary atmospheric gas is a humidified mixture of $N_2$ and $H_2$ gases.

Firing of the capacitor chip in a reducing atmosphere is preferably followed by annealing. Annealing is effective for re-oxidizing the dielectric layers, thereby extending the accelerated life of IR. The annealing atmosphere may have an oxygen partial pressure of at least $10^{-6}$ atm., preferably $10^{-5}$ to $10^{-4}$ atm. The dielectric layers are short of re-oxidization at a low oxygen partial pressure below the range whereas the internal electrode layers are likely to be oxidized above the range.

For annealing, the chip is preferably held at a temperature of lower than 1,100° C., more preferably 500° to 1,000° C. Lower holding temperatures below the range would oxidize the dielectric layers to a less extent leading to a shorter life. Higher holding temperatures beyond the range can cause the internal electrode layers to be oxidized (leading to a reduced capacitance) and to react with the dielectric material (leading to a shorter life). Annealing can be accomplished simply by heating and cooling. In this case, the holding temperature is equal to the highest temperature on heating and the holding time is zero.

Remaining conditions for annealing are preferably as follows.

Holding time: 0–20 hours, especially 6–10 hours

Cooling rate: 50°–500° C./hour, especially 100°–300° C./hour

The preferred atmospheric gas for annealing is humid nitrogen gas.

For humidifying nitrogen gas or a gas mixture used in binder removal, firing and annealing, a wetter may be used, for example. In this regard, water temperature is preferably about 5° to 75° C.

The foregoing binder removal, firing and annealing may be carried out either continuously or separately. The continuous mode includes the steps of binder removal, changing only the atmosphere without cooling, raising the temperature to the firing temperature, holding the chip at that temperature for firing, lowering the temperature to the annealing temperature, changing the atmosphere at that temperature, and annealing.

In the separate mode, after binder removal and cooling down, the temperature of the chip is raised to the binder removing temperature in dry or humid nitrogen gas whereupon the atmosphere is changed to a reducing one, and the temperature is further raised for firing. Thereafter, the temperature is lowered to the annealing temperature whereupon the atmosphere is again changed to dry or humid nitrogen gas and cooling is continued. Alternatively, once cooled down, the temperature may be raised to the annealing temperature in a nitrogen gas atmosphere whereupon the atmosphere is changed. The entire annealing step may be done in a humid nitrogen gas atmosphere.

The thus obtained chip is polished at end faces by barrel tumbling and sand blasting, for example, before the external electrode-forming paste is printed or transferred and baked to form external electrodes. Firing of the external electrode-forming paste is under conditions: a humid mixture of nitrogen and hydrogen gases, about 600° to 800° C., and about 10 minutes to about 1 hour, for example.

If necessary, pads are formed on the external electrodes as by plating.

The multilayer ceramic chip capacitors of the invention thus prepared are mounted on printed circuit boards, for example, by soldering before use in various electronic equipment.

During operation of the multilayer ceramic chip capacitors of the invention, a DC electric field of at least 0.02 V/$\mu$m, often at least 0.2 V/$\mu$m, more often at least 0.5 V/$\mu$m and generally up to about 5 V/$\mu$m is applied to the dielectric layers as well as an overlapping AC component. The capacitors experience a minimized change of their capacitance with the lapse of time even when such a DC electric field is applied.

EXAMPLE

Examples of the invention are given below by way of illustration and not by way of limitation. All parts are by weight.

Example 1

Pastes were prepared.

A dielectric layer-forming paste was prepared. A raw dielectric material was first prepared by selecting appropriate components from powders of $BaTiO_3$, $(MgCO_3)_4 \cdot Mg(OH)_2 \cdot 5H_2O$, $MnCO_3$, $(Ba_{0.5}Ca_{0.5})SiO_3$, and $Y_2O_3$ having a particle size of 0.1 to 1 $\mu$m, wet milling the selected components in a ball mill for 16 hours, and drying the mixture by means of a spray dryer. By changing the mixing proportion of the respective powders (as estimated from Table 1), there were prepared a plurality of raw dielectric materials.

Then a paste was prepared by milling 100 parts of each raw dielectric material, 4.8 parts of an acrylic resin, 40 parts of methylene chloride, 20 parts of trichlorethane, 6 parts of mineral spirit, and 4 parts of acetone in a ball mill.

An internal electrode layer-forming paste was prepared by milling 100 parts of nickel particles having a mean particle size of 0.8 $\mu$m, 40 parts of an organic vehicle (obtained by dissolving 8 parts by weight of ethyl cellulose resin in 92 parts of butylcarbinol), and 10 parts of butylcarbinol in a three-roll mill.

An external electrode-forming paste was prepared by milling 100 parts of copper particles having a mean particle size of 0.5 $\mu$m, 35 parts of an organic vehicle (obtained by dissolving 8 parts by weight of ethyl cellulose resin in 92 parts of butylcarbinol), and 7 parts of butylcarbinol.

Using the dielectric layer-forming pastes and the internal electrode layer-forming paste, multilayer ceramic chip capacitors of the configuration shown in FIG. 1 were fabricated.

First the dielectric layer-forming paste was applied to PET film to form a green sheet, onto which the internal electrode layer-forming paste was printed. The green sheet was separated from the PET film. Four such green sheets were stacked and bonded under pressure to form a green chip.

After cutting to a predetermined size, the green chip was continuously removed of the binder, fired, and annealed under the following conditions, obtaining a capacitor chip.

Binder removal
  Heating rate: 15° C./hr.
  Holding temperature: 280° C.
  Holding time: 8 hours
  Atmospheric gas: air
Firing
  Heating rate: 200° C./hr.
  Holding temperature: 1300° C.
  Holding time: 2 hours
  Cooling rate: 300° C./hr.
  Atmospheric gas: humid $N_2$ and $H_2$ gas mixture
  Oxygen partial pressure: $10^{-9}$ atm.
Annealing
  Holding temperature: 900° C.
  Holding time: 9 hours
  Cooling rate: 300° C./hr.
  Atmospheric gas: humid $N_2$ gas
  Oxygen partial pressure: $10^{-5}$ atm.

For humidifying the atmospheric gases, a wetter was used at a water temperature of 35° C.

The chip thus obtained was polished at end faces by sand blasting. The external electrode-forming paste was transferred to the end faces and fired in a humid $N_2+H_2$ gas atmosphere at 800° C. for 10 minutes to form external electrodes. There was completed a multilayer ceramic chip capacitor.

The capacitor samples had dimensions 3.2 mm×1.6 mm×1.2 mm, the dielectric layers were 15 $\mu$m thick, and the internal electrodes were 2.5 $\mu$m thick.

The composition of the dielectric layers of each sample is shown in Table 1. The contents of the respective components were calculated on the basis previously defined in the Summary section. In Table 1, (Ba,Ca)-$SiO_3$ is $(Ba_{0.5}Ca_{0.5})SiO_3$.

The samples were examined by the following tests.
Temperature dependence of capacitance X7R characteristic: Using an LCR meter, the capacitance was measured with a measuring voltage of 1 volt over the temperature range between −55° C. and 125° C. to examine whether or not a capacitance change might fall within ±15% (reference temperature 25° C.). The sample was rated "O" when the requirement was satisfied and "X" when not satisfied.
Change of capacitance with time in a DC electric field Using an LCR meter, a sample was measured for initial capacitance $C_0$ with a measuring AC voltage of 1.0 volt. A voltage of 16 volts was applied across the sample at 40° C. for 66 hours to provide a DC electric field of 1.06 volts per $\mu$m of the dielectric layer thickness. The sample was then allowed to stand at room temperature for 24 hours in an unloaded state, and measured for capacitance C again under the same conditions as the initial. A change from the initial capacitance, $\Delta C = C - C_0$, was determined, and a percent change $\Delta C/C_0$ was calculated.

Accelerated life of IR

The sample was subjected to an accelerated test under an electric field of 10 V/$\mu$m at 180° C. The life was the time passed until the insulation resistance (IR) lowered to below $2 \times 10^5$ $\Omega$.

Dielectric constant $\epsilon_s$

A dielectric constant $\epsilon_s$ was measured at 25° C.

Figure 4:
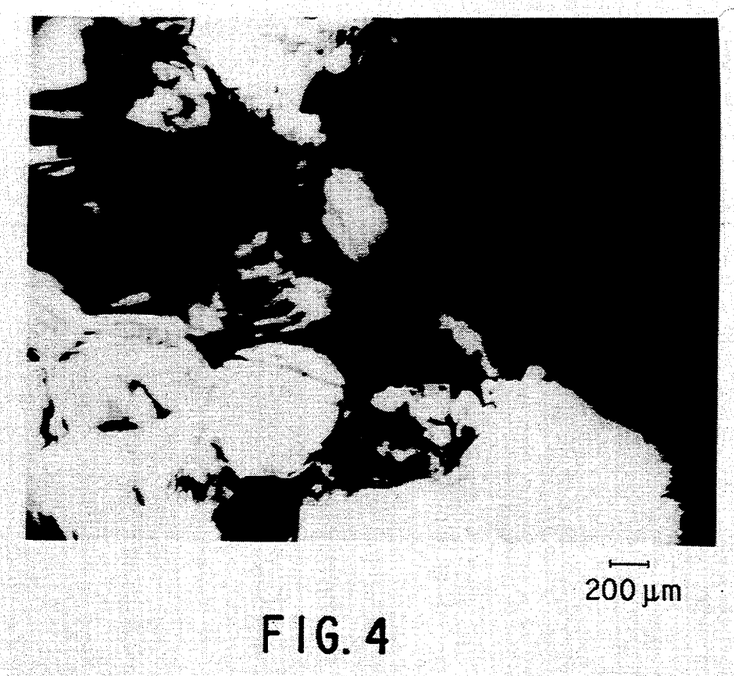
FIGS. 4 and 5 are TEM photomicrographs in cross section of a dielectric layer used in a comparative sample of multilayer ceramic chip capacitor before and after application of a DC electric field, respectively.
Figure 5:
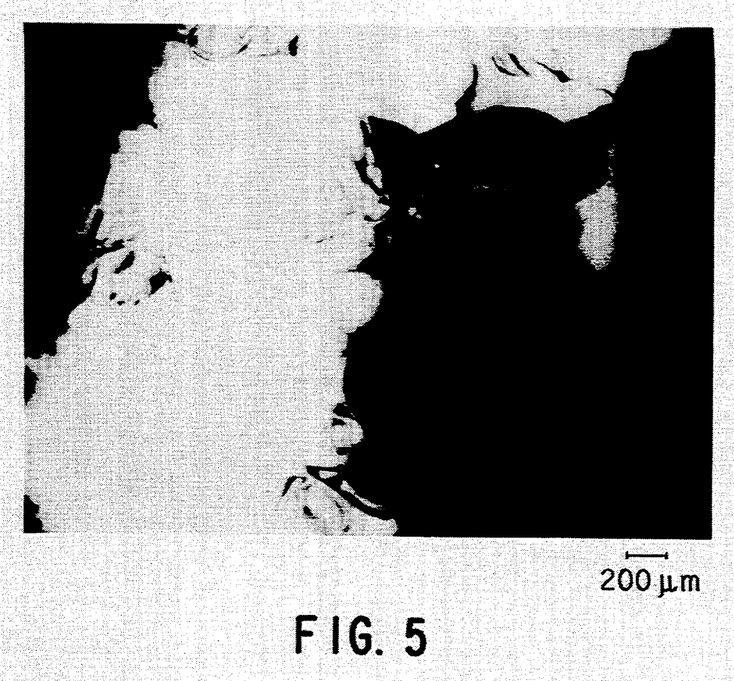

The results are shown in Table 1.

before application and FIG. 5 is a photo after application. It is seen that the number of domains is reduced by the application of a DC electric field.

Example 2

Pastes were prepared.

A dielectric layer-forming paste was prepared. A raw dielectric material was first prepared by selecting appropriate components from powders of $BaTiO_3$, $(MgCO_3)_4 \cdot Mg(OH)_2 \cdot 5H_2O$, $MnCO_3$, $BaCO_3$, $CaCO_3$, $SiO_2$, and $Y_2O_3$ having a particle size of 0.1 to 1 $\mu$m, wet

TABLE 1

| Sample No. | Dielectric layer composition | | | | X7R | $\Delta C/C_0$ (%) | Acceld. IR life (hr.) | $\epsilon_s$ (25° C.) |
|---|---|---|---|---|---|---|---|---|
| | MgO (mol) | MnO (mol) | (Ba,Ca)SiO$_3$ (wt %) | Y$_2$O$_3$ (mol) | | | | |
| 1-1 | 1 | 0.375 | 5 | 0 | ○ | −1.42 | 2.7 | 2871 |
| 1-2 | 1 | 0.375 | 5 | 0.04 | ○ | −1.58 | 5.0 | 2729 |
| 1-3 | 1 | 0.375 | 5 | 0.09 | ○ | −1.23 | 11.3 | 2565 |
| 1-4 | 1 | 0.375 | 5 | 0.18 | ○ | −1.58 | 13.9 | 2495 |
| 1-5 | 1 | 0.375 | 5 | 0.27 | ○ | −1.85 | 27.3 | 2530 |
| 1-6 | 1 | 0.19 | 5 | 0 | ○ | −0.65 | 5.0 | 2758 |
| 1-7 | 1 | 0.19 | 5 | 0.04 | ○ | −0.85 | 5.2 | 2663 |
| 1-8 | 1 | 0.19 | 5 | 0.09 | ○ | −1.13 | 4.2 | 2670 |
| 1-9 | 1 | 0.19 | 5 | 0.18 | ○ | −0.43 | 9.7 | 2760 |
| 1-10 | 1 | 0.19 | 5 | 0.27 | ○ | −0.16 | 14.9 | 2652 |
| 1-11 | 1.2 | 0.375 | 5 | 0 | ○ | −0.06 | 2.2 | 2952 |
| 1-12 | 1.2 | 0.375 | 5 | 0.04 | ○ | −0.25 | 7.6 | 2772 |
| 1-13 | 1.2 | 0.375 | 5 | 0.09 | ○ | −0.71 | 6.0 | 2895 |
| 1-14 | 1.2 | 0.375 | 5 | 0.18 | ○ | −2.44 | 15.3 | 2542 |
| 1-15 | 1.2 | 0.375 | 5 | 0.27 | ○ | −2.75 | 34.3 | 2359 |
| 1-16 (comparison) | 0* | 0.1 | 5 | 0.2 | X | −5.11 | 1.0 | 5241 |
| 1-17 (comparison) | 1 | 0* | 5 | 0.2 | X | −0.52 | 0.1 | 3218 |
| 1-18 (comparison) | 1 | 2* | 5 | 0.2 | ○ | −5.77 | 5.4 | 2153 |
| 1-19 (comparison) | 1 | 0.1 | 0* | 0.2 | X | −8.38 | 0 | 4827 |

*outside the scope of the invention

The advantages of the invention are evident from the data of Table 1. More specifically, the samples having a dielectric layer composition within the scope of the invention satisfy the X7R characteristic and show a very small change of capacitance with time in a DC electric field of less than 10% and a long life of IR as measured by the accelerated test. The life of IR is further extended by the addition of yttrium oxide. The inventive samples in Table 1 also satisfy the B characteristic that is a capacitance change within ±10% (reference temperature 20° C.) over the temperature range between −25° C. and 85° C.

Figure 2:
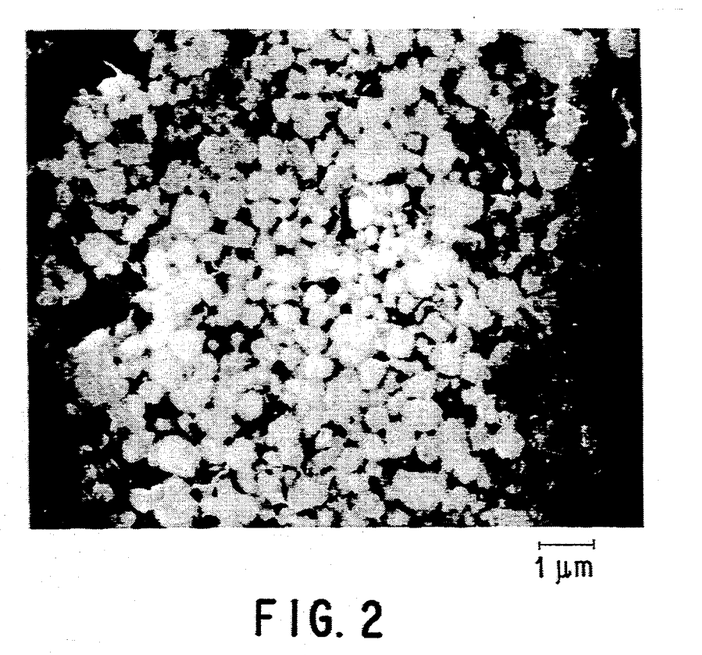
FIG. 2 is a SEM photomicrograph in cross section of a dielectric layer in a multilayer ceramic chip capacitor according to the invention.
Figure 3:
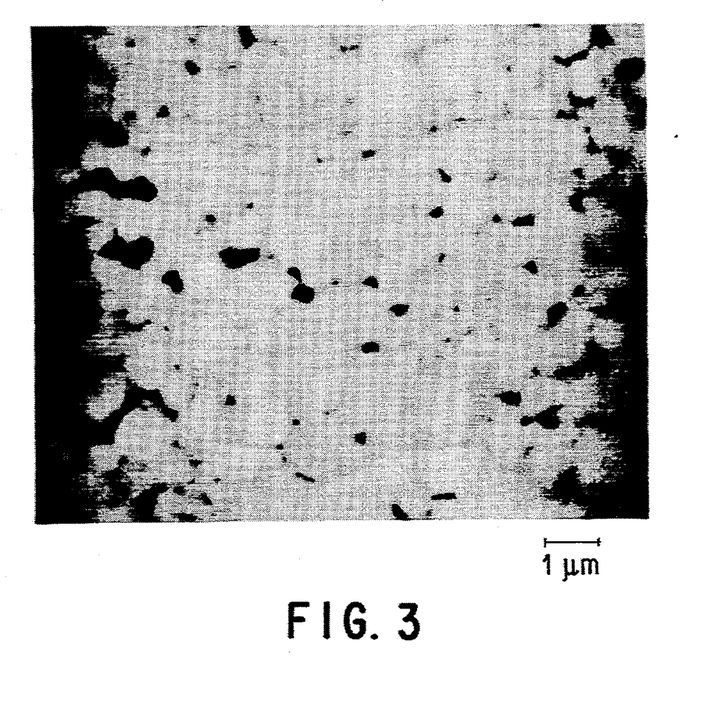
FIG. 3 is a SEM photomicrograph in cross section of a dielectric layer in a prior art multilayer ceramic chip capacitor.

FIGS. 2 and 3 are photomicrographs taken through a scanning electron microscope in cross section of the dielectric layers of inventive sample No. 1-1 and comparative sample No. 1-16. These photos were taken after polishing a dielectric layer cross section to a mirror finish and etching the section with an aqueous solution of hydrofluoric acid and nitric acid. The photo of FIG. 3 or comparative sample No. 1-16 shows an average crystal grain size of about 1 $\mu$m and an average grain boundary width of about 0.2 $\mu$m. The photo of FIG. 2 or inventive sample No. 1-1 shows finer grains as seen from an average crystal grain size of about 0.5 $\mu$m and an average grain boundary width of about 0.2 $\mu$m. Analogous relationship was found among the remaining inventive and comparative samples reported in Table 1.

Using a transmission electron microscope, photographs in cross section of the dielectric layer of comparative sample No. 1-16 were taken before and after the application of a DC electric field. FIG. 4 is a photo milling the selected components in a ball mill for 16 hours, and drying the mixture by means of a spray dryer. By changing the mixing proportion of the respective powders (as estimated from Table 1), there were prepared a plurality of raw dielectric materials.

Then a paste was prepared by milling 100 parts of each raw dielectric material, 4.8 parts of an acrylic resin, 40 parts of methylene chloride, 20 parts of trichloroethane, 6 parts of mineral spirit, and 4 parts of acetone in a ball mill.

An internal electrode layer-forming paste was prepared by milling 100 parts of nickel particles having a mean particle size of 0.8 $\mu$m, 40 parts of an organic vehicle (obtained by dissolving 8 parts by weight of ethyl cellulose resin in 92 parts of butylcarbinol), and 10 parts of butylcarbinol in a three-roll mill.

An external electrode-forming paste was prepared by milling 100 parts of copper particles having a mean particle size of 0.5 $\mu$m, 35 parts of an organic vehicle (obtained by dissolving 8 parts by weight of ethyl cellulose resin in 92 parts of butylcarbinol), and 7 parts of butylcarbinol.

Using the dielectric layer-forming pastes and the internal electrode layer-forming paste, multilayer ceramic chip capacitors of the configuration shown in FIG. 1 were fabricated.

First the dielectric layer-forming paste was applied to PET film to form a green sheet of 20 $\mu$m thick, onto which the internal electrode layer-forming paste was printed. The green sheet was separated from the PET film. Four such green sheets were stacked and bonded under pressure to form a green chip.

After cutting to a predetermined size, the green chip was continuously removed of the binder, fired, and annealed under the following conditions, obtaining a capacitor chip.

Binder removal
  Heating rate: 15° C./hr.
  Holding temperature: 280° C.
  Holding time: 8 hours
  Atmospheric gas: air
Firing
  Heating rate: 200° C./hr.
  Holding temperature: 1300° C.
  Holding time: 2 hours
  Cooling rate: 300° C./hr.
  Atmospheric gas: humid $N_2$ and $H_2$ gas mixture
  Oxygen partial pressure: $10^{-9}$ atm.
Annealing
  Holding temperature: 900° C.
  Holding time: 9 hours
  Cooling rate: 300° C./hr.
  Atmospheric gas: humid $N_2$ gas
  Oxygen partial pressure: $10^{-5}$ atm.

For humidifying the atmospheric gases, a wetter was used at a water temperature of 35° C.

The chip thus obtained was polished at end faces by sand blasting. The external electrode-forming paste was transferred to the end faces and fired in a humid $N_2+H_2$ gas atmosphere at 800° C. for 10 minutes to form external electrodes. There was completed a multilayer ceramic chip capacitor.

The capacitor samples had dimensions 3.2 mm×1.6 mm×0.6 mm, the dielectric layers were 15 μm thick, and the internal electrodes were 2.5 μm thick.

The composition of the dielectric layers of each sample is shown in Table 2. The contents of the respective components were calculated on the basis previously defined in the Summary section.

The samples were examined by the following tests.
Temperature dependence of capacitance X7R characteristic: Using an LCR meter, the capacitance was measured with a measuring voltage of 1 volt over the temperature range between −55° C. and 125° C. to examine whether or not a capacitance change might fall within ±15% (reference temperature 25° C.). The sample was rated "O" when the requirement was satisfied and "X" when not satisfied.

Change of capacitance with time in a DC electric field

Using an LCR meter, a sample was measured for initial capacitance $C_0$ with a measuring AC voltage of 1.0 volt. A voltage of 16 volts was applied across the sample at 40° C. for 100 hours to provide a DC electric field of 1.06 volts per μm of the dielectric layer thickness. The sample was then allowed to stand at room temperature for 24 hours in an unloaded state, and measured for capacitance $C_1$ again under the same conditions as the initial. A change from the initial capacitance, $\Delta C_1 = C_1 - C_0$, was determined, and a percent change $\Delta C_1/C_0$ was calculated.

Accelerated life of IR

The sample was subjected to an accelerated test under an electric field of 10 V/μm at 220° C. The life was the time passed until the insulation resistance (IR) lowered to below $2\times 10^5$ Ω.

Dielectric constant $\epsilon_s$

A dielectric constant $\epsilon_s$ was measured at 25° C.

DC bias performance

Using an LCR meter, a sample was measured for initial capacitance $C_0$ with a measuring AC voltage of 1.0 volt. Next, with an AC voltage of 1.0 volt applied, a DC electric field of 1.0 volt per μm of the dielectric layer thickness was applied overlappingly to the sample which was measured for capacitance $C_2$. A change from the initial capacitance, $\Delta C_2 = C_2 - C_0$, was determined, and a percent change $\Delta C_2/C_0$ was calculated.

The results are shown in Table 2.

TABLE 2

| Sample No. | Dielectric layer composition | | | | | | | | X7R | $\Delta C_1/C_0$ (%) | Acceld. IR life (hr.) | $\epsilon_s$ (25° C.) | DC bias (%) |
|---|---|---|---|---|---|---|---|---|---|---|---|---|---|
| | MgO (mol) | $Y_2O_3$ (mol) | BaO (mol) | CaO (mol) | BaO + CaO (mol) | $SiO_2$ (mol) | MnO (mol) | $Al_2O_3$ (wt %) | | | | | |
| 2-1 | 2 | 1.06* | 3.36 | 2.44 | 5.8 | 5.8 | 0.19 | 0 | O | −0.90 | 6.7 | 2610 | −2.19 |
| 2-2 | 2 | 2.13 | 3.36 | 2.44 | 5.8 | 5.8 | 0.19 | 0 | O | −0.74 | 10.2 | 2580 | −1.62 |
| 2-3 | 2 | 3.19 | 3.36 | 2.44 | 5.8 | 5.8 | 0.19 | 0 | O | −0.46 | 26.3 | 2490 | −2.18 |
| 2-4 | 2 | 4.25* | 3.36 | 2.44 | 5.8 | 5.8 | 0.19 | 0 | O | −0.20 | 4.4 | 2420 | −2.89 |
| 2-5 | 1.25 | 2.13 | 3.36 | 2.44 | 5.8 | 5.8 | 0.19 | 0 | O | −1.35 | 14.2 | 2820 | −2.65 |
| 2-6 | 1.50 | 2.13 | 3.36 | 2.44 | 5.8 | 5.8 | 0.19 | 0 | O | −1.16 | 13.1 | 2710 | −2.34 |
| 2-7 | 1.75 | 2.13 | 3.36 | 2.44 | 5.8 | 5.8 | 0.19 | 0 | O | −0.92 | 11.8 | 2620 | −2.08 |
| 2-8 | 2 | 2.13 | 2.32 | 1.68 | 4.0 | 4.0 | 0.19 | 0 | O | −1.59 | 12.6 | 2890 | −2.98 |
| 2-9 | 2 | 2.13 | 4.64 | 3.36 | 8.0* | 8.0* | 0.19 | 0 | O | −0.71 | 3.3 | 2310 | −1.84 |
| 2-10 | 2 | 2.13 | 5.80 | 0 | 5.8 | 5.8 | 0.19 | 0 | O | −0.96 | 9.7 | 2580 | −2.06 |
| 2-11 | 2 | 2.13 | 0 | 5.80 | 5.8 | 5.8 | 0.19 | 0 | O | −0.91 | 11.8 | 2600 | −2.17 |
| 2-12 | 2 | 2.13 | 3.36 | 2.44 | 5.8 | 3.0 | 0.19 | 0 | O | −1.87 | 10.5 | 2670 | −2.91 |
| 2-13 | 2 | 2.13 | 1.74 | 1.26 | 3.0 | 5.8 | 0.19 | 0 | O | −1.62 | 9.1 | 2610 | −2.87 |
| 2-14 | 2 | 2.13 | 3.36 | 2.44 | 5.8 | 5.8 | 0* | 0 | O | −0.58 | 5.0 | 2980 | −3.55 |
| 2-15 | 2 | 2.13 | 3.36 | 2.44 | 5.8 | 5.8 | 0.05 | 0 | O | −0.61 | 6.2 | 2860 | −3.11 |
| 2-16 | 2 | 2.13 | 3.36 | 2.44 | 5.8 | 5.8 | 0.10 | 0 | O | −0.69 | 7.8 | 2770 | −2.54 |
| 2-17 | 2 | 2.13 | 3.36 | 2.44 | 5.8 | 5.8 | 0.38* | 0 | O | −1.92 | 12.1 | 2530 | −1.99 |
| 2-18 | 2 | 2.13 | 3.36 | 2.44 | 5.8 | 5.8 | 0.19 | 0.4 | O | −1.56 | 2.6 | 2150 | −2.45 |
| 2-19 | 2 | 2.13 | 0 | 0 | 0** | 0** | 0.19 | 0 | X | −6.34 | 0.8 | 4790 | −4.12 |
| 2-20 | 2 | 2.13 | 10.44 | 7.56 | 18.0** | 18.0** | 0.19 | 0 | X | −1.62 | 2.2 | 1540 | −2.43 |
| 2-21 | 2 | 0.53** | 3.36 | 2.44 | 5.8 | 5.8 | 0.38* | 0 | O | −2.12 | 3.1 | 2590 | −8.93 |
| 2-22 | 0** | 2.13 | 3.36 | 2.44 | 5.8 | 5.8 | 0.19 | 0 | X | −4.94 | 2.9 | 3110 | −4.65 |
| 2-23 | 2 | 2.13 | 3.36 | 2.44 | 5.8 | 5.8 | 1.0** | 0 | O | −9.87 | 13.9 | 2290 | −2.74 |
| 2-24 | 2 | 2.13 | 3.36 | 2.44 | 5.8 | 5.8 | 0.19 | 3.0* | O | −3.61 | 0.4 | 1530 | −3.94 |

*outside the preferred range
**outside the scope of the invention

The advantages of the invention are evident from the data of Table 2. More specifically, the samples having a dielectric layer composition within the scope of the invention satisfy the X7R characteristic and show a very small change of capacitance with time in a DC electric field and a long life of IR as measured by the accelerated test. The life of IR and DC bias performance are significantly improved by adding more than 1 mol of yttrium oxide ($Y_2O_3$). The inventive samples in Table 2 also satisfy the B characteristic that is a capacitance change within ±10% (reference temperature 20° C.) over the temperature range between −25° C. and 85° C.

ADVANTAGES

There are described multilayer ceramic chip capacitors which satisfy the X7R and B characteristics relating to the temperature dependence of capacitance and show a very small change of capacitance with time under an applied DC electric field and a long insulation resistance life as measured by the accelerated test. The capacitors are also improved in DC bias performance. Accordingly, the capacitors show practically acceptable performance even when the dielectric layers have a thickness of 50 μm or less.

Although some preferred embodiments have been described, many modifications and variations may be made thereto in the light of the above teachings. It is therefore to be understood that within the scope of the appended claims, the invention may be practiced otherwise than as specifically described.

We claim:

1. A multilayer ceramic chip capacitor comprising alternately stacked dielectric layers and internal electrode layers, wherein said dielectric layers contain barium titanate as a major component and magnesium oxide, manganese oxide, at least one of barium oxide and calcium oxide, and silicon oxide as minor components in such a proportion that there are present
MgO: 0.1-3 mol
MnO: 0.05-1.0 mol
BaO+CaO: 2-12 mol
$SiO_2$: 2-12 mol per 100 mol of $BaTiO_3$, provided that the barium titanate, magnesium oxide, manganese oxide, barium oxide, calcium oxide, and silicon oxide are calculated as $BaTiO_3$, MgO, MnO, BaO, CaO, and $SiO_2$, respectively.

2. The multilayer ceramic chip capacitor of claim 1 wherein in said dielectric layers, BaO, CaO and $SiO_2$ are contained in the form of $(Ba_xCa_{1-x}O)_y \cdot SiO_2$ in an amount of 1 to 10% by weight based on the total weight of $BaTiO_3$, MgO and MnO wherein letters x and y are $0.3 \leq x \leq 0.7$ and $0.95 \leq y \leq 1.05$.

3. The multilayer ceramic chip capacitor of claim 1 wherein said internal electrode layers contain a conductor in the form of nickel or a nickel alloy.

4. The multilayer ceramic chip capacitor of claim 3 which has been fired in an atmosphere having an oxygen partial pressure of $10^{-8}$ to $10^{-12}$ atm. at a temperature of 1,200° C. to 1,400° C.

5. The multilayer ceramic chip capacitor of claim 4 which has been annealed in an atmosphere having an oxygen partial pressure of at least $10^{-6}$ atm. at a temperature of up to 1,100° C. after firing.

6. A multilayer ceramic chip capacitor comprising alternately stacked dielectric layers and internal electrode layers, wherein said dielectric layers contain barium titanate as a major component and magnesium oxide, manganese oxide, yttrium oxide, at least one of barium oxide and calcium oxide, and silicon oxide as minor components in such a proportion that there are present
MgO: 0.1-3 mol
MnO: 0.05-1.0 mol
$Y_2O_3$: up to 1 mol
BaO+CaO: 2-12 mol
$SiO_2$: 2-12 mol per 100 mol of $BaTiO_3$, provided that the barium titanate, magnesium oxide, manganese oxide, yttrium oxide, barium oxide, calcium oxide, and silicon oxide are calculated as $BaTiO_3$, MgO, MnO, $Y_2O_3$, BaO, CaO, and $SiO_2$, respectively.

7. The multilayer ceramic chip capacitor of claim 6 wherein in said dielectric layers, BaO, CaO and $SiO_2$ are contained in the form of $(Ba_xCa_{1-x}O)_y \cdot SiO_2$ in an amount of 1 to 10% by weight based on the total weight of $BaTiO_3$, MgO, MnO and $Y_2O_3$ wherein letters x and y are $0.3 \leq x \leq 0.7$ and $0.95 \leq y \leq 1.05$.

8. The multilayer ceramic chip capacitor of claim 6 wherein said internal electrode layers contain a conductor in the form of nickel or a nickel alloy.

9. The multilayer ceramic chip capacitor of claim 8 which has been fired in an atmosphere having an oxygen partial pressure of $10^{-8}$ to $10^{-12}$ atm. at a temperature of 1,200° C. to 1,400° C.

10. The multilayer ceramic chip capacitor of claim 9 which has been annealed in an atmosphere having an oxygen partial pressure of at least $10^{-6}$ atm. at a temperature of up to 1,100° C. after firing.

11. A multilayer ceramic chip capacitor comprising alternately stacked dielectric layers and internal electrode layers, wherein said dielectric layers contain barium titanate as a major component and magnesium oxide, yttrium oxide, at least one of barium oxide and calcium oxide, and silicon oxide as minor components in such a proportion that there are present
MgO: 0.1-3 mol
$Y_2O_3$: more than 1 mol-5 mol
BaO+CaO: 2-12 mol
$SiO_2$: 2-12 mol per 100 mol of $BaTiO_3$, provided that the barium titanate, magnesium oxide, yttrium oxide, barium oxide, calcium oxide, and silicon oxide are calculated as $BaTiO_3$, MgO, $Y_2O_3$, BaO, CaO, and $SiO_2$, respectively.

12. The multilayer ceramic chip capacitor of claim 11 wherein said dielectric layers further contain aluminum oxide in an amount of up to 1% by weight calculated as $Al_2O_3$.

13. The multilayer ceramic chip capacitor of claim 11 wherein said dielectric layers further contain manganese oxide as a minor component in such a proportion that there is present up to 0.5 mol of MnO per 100 mol of $BaTiO_3$, provided that the manganese oxide is calculated as MnO.

14. The multilayer ceramic chip capacitor of claim 13 wherein said internal electrode layers contain a conductor in the form of nickel or nickel alloy.

15. The multilayer ceramic chip capacitor of claim 14 which has been fired in an atmosphere having an oxygen partial pressure of $10^{-8}$ to $10^{-12}$ atm. at a temperature of 1,200° C. to 1,400° C.

16. The multilayer ceramic chip capacitor of claim 15 which has been annealed in an atmosphere having an oxygen partial pressure of at least $10^{-6}$ atm. at a temperature of up to 1,100° C. after firing.

* * * * *